United States Patent
Sano

(10) Patent No.: US 7,224,782 B2
(45) Date of Patent: May 29, 2007

(54) METHOD FOR PROVIDING ADDITIONAL SERVICE BY A COMMUNICATION COMPANY

(75) Inventor: Motonori Sano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 10/054,908

(22) Filed: Jan. 25, 2002

(65) Prior Publication Data

US 2002/0101968 A1    Aug. 1, 2002

(30) Foreign Application Priority Data

Jan. 31, 2001    (JP)    ............... 2001-023571

(51) Int. Cl.
*H04M 15/00*    (2006.01)

(52) U.S. Cl. ............... 379/114.12; 379/114.02

(58) Field of Classification Search ........... 379/114.12, 379/114.02, 114.01, 221.02, 201.01, 207.03; 705/14; 455/445, 405, 406
See application file for complete search history.

(56) References Cited

U.S. PATENT DOCUMENTS

| | | | |
|---|---|---|---|
| 4,916,510 A | 4/1990 | Sano et al. ............... 357/4 |
| 5,248,621 A | 9/1993 | Sano ............... 437/3 |
| 5,408,526 A * | 4/1995 | McFarland et al. .... 379/202.01 |
| 5,436,962 A | 7/1995 | Hirata ............... 379/212 |
| 5,570,417 A * | 10/1996 | Byers ............... 379/114.02 |
| 5,631,904 A * | 5/1997 | Fitser et al. ............... 370/261 |
| 5,732,132 A | 3/1998 | Hamada ............... 379/354 |
| 5,857,017 A | 1/1999 | Ohi et al. ............... 379/157 |
| 5,862,203 A * | 1/1999 | Wulkan et al. ......... 379/114.02 |
| 5,953,400 A * | 9/1999 | Rosenthal et al. ..... 379/202.01 |
| 6,134,220 A | 10/2000 | Le Strat et al. ............... 370/252 |
| 6,229,985 B1 | 5/2001 | Arai ............... 455/8 |
| 6,427,008 B1 * | 7/2002 | Balaz ............... 379/202.01 |
| 6,597,903 B1 * | 7/2003 | Dahm et al. ............... 455/405 |
| 6,853,636 B1 * | 2/2005 | Merchant ............... 370/352 |

FOREIGN PATENT DOCUMENTS

EP    0 969 682 A1    1/2000

* cited by examiner

*Primary Examiner*—Barry Taylor
(74) *Attorney, Agent, or Firm*—Fitzpatrick, Cella, Harper & Scinto.

(57) ABSTRACT

A communication company accumulates a communication time or the amount of communication for a call when the call is received, and provides additional service such as discount for a called party according to an accumulated communication time or the accumulated amount of communication. Another example of additional service is discount made according to whether a first communication company providing communication service between a called party and a first switching office and a second communication company providing communication service between a calling party and a second switching office are identical.

30 Claims, 14 Drawing Sheets

FIG. 5

| INFORMATION USED FOR DETERMINATION | CONDITIONS REQUIRED BY CALLING PARTY | CONDITIONS SPECIFIED BY CALLED PARTY |
|---|---|---|
| COMMUNICATION SERVICE OR BUSINESS PARTY CORRESPONDING TO TELEPHONE NUMBER | | |
| WHETHER E-MAIL SERVICE IS PROVIDED | E-MAIL SERVICE PROVIDED | |
| WHETHER WEB SERVICE IS PROVIDED | | |
| WHETHER BEING-CALLED NOTICE DURING BUSY TIME IS PROVIDED | | |
| COMMUNICATION CHARGE | INEXPENSIVE COMMUNICATION CHARGE | |
| MAXIMUM TRANSFER RATE | HIGH MAXIMUM TRANSFER RATE | |
| POSITION OF MOBILE COMMUNICATION TERMINAL | | |
| WHETHER COMMUNICATION TERMINAL IS COMMUNICATING | | |
| WHETHER VACANT PATH TO COMMUNICATION TERMINAL IS PROVIDED | | |
| WHERE MOBILE COMMUNICATION TERMINAL IS LOCATED WITHIN SERVICE AREA | WHETHER MOBILE COMMUNICATION TERMINAL BEING CALLED IS LOCATED CLOSE TO SERVICE-AREA BOUNDARY | |
| MAXIMUM TRANSFER RATE CURRENTLY AVAILABLE | MAXIMUM TRANSFER RATE WHEN THEY ARE CONNECTED | |
| AVAILABLE SERVICE AREA FOR MOBILE COMMUNICATION TERMINAL | WIDE SERVICE AREA, USABLE AT PREDETERMINED PLACE | WIDE SERVICE AREA, USABLE AT PREDETERMINED PLACE |
| BATTERY POWER CONSUMPTION | | LOW POWER CONSUMPTION OF BATTERY |

FIG. 8

| ACCUMULATED COMMUNICATION TIME OF CALLS RECEIVED BY USER A | LESS THAN ONE HOUR | ONE HOUR TO LESS THAN FOUR HOURS | FOUR HOURS OR MORE |
|---|---|---|---|
| DISCOUNT TO USER A | NO DISCOUNT | 5% DISCOUNT FROM COMMUNICATION CHARGE WITHIN PREDETERMINED PERIOD | 10% DISCOUNT FROM COMMUNICATION CHARGE WITHIN PREDETERMINED PERIOD |

FIG. 11

| ACCUMULATED COMMUNICATION TIME OF CALLS RECEIVED BY USER A AND ALSO SENT THROUGH BUSINESS PARTY X | LESS THAN ONE HOUR | ONE HOUR TO LESS THAN FOUR HOURS | FOUR HOURS OR MORE |
|---|---|---|---|
| DISCOUNT TO USER A | NO DISCOUNT | 10% DISCOUNT FROM COMMUNICATION CHARGE WITHIN PREDETERMINED PERIOD | 20% DISCOUNT FROM COMMUNICATION CHARGE WITHIN PREDETERMINED PERIOD |

FIG. 14

| ACCUMULATED COMMUNICATION TIME OF CALLS RECEIVED BY USER A AND SENT THROUGH BUSINESS PARTY OTHER THAN BUSINESS PARTY X | LESS THAN ONE HOUR | ONE HOUR TO LESS THAN FOUR HOURS | FOUR HOURS OR MORE |
|---|---|---|---|
| DISCOUNT TO USER A | NO DISCOUNT | 5% DISCOUNT FROM COMMUNICATION CHARGE WITHIN PREDETERMINED PERIOD | 10% DISCOUNT FROM COMMUNICATION CHARGE WITHIN PREDETERMINED PERIOD |

METHOD FOR PROVIDING ADDITIONAL SERVICE BY A COMMUNICATION COMPANY

BACKGROUND OF THE INVENTION

1. Field of the Invention

The present invention relates to methods for providing additional communication services by communication companies that provide communication services between communication terminals and switching offices.

2. Description of the Related Art

FIG. 1 is a schematic view of a conventional communication network.

In FIGS. 1, A, B, and C represent separate communication companies that provide communication services such as, for example, long distance communication. When a calling party 201, which subscribes for a fee to a communication company's communication services, makes a call using that company's communication services, the communication company connects a switching office 202 closest to the calling party to a switching office 203 closest to a called party by a private communication line 205 owned by that communication company.

Since a plurality of communication companies provide communication services in the above-described form, a calling party can contract with a plurality of communication companies and use communication services of the communication company offering communication services with the most desirable features, such as, for example, the lowest cost.

A communication company often provides calling parties with additional services, such as, for example, communication charge discounts based on the length of time during certain periods of the day a subscribing calling party uses the communication company's communication service. Such additional services are intended to entice calling parties to use the communication company's communication services as much as possible for the calling parties' communication needs.

A plurality of communication companies conventionally provide communication services between mobile communication terminals and switching offices. In the future, it is expected that communication terminals will be developed that will allow users to contract with a plurality of communication companies for communication service between communication terminals and switching offices. In addition, it is possible that each communication terminal will be connected to a plurality of communication companies.

When a calling party can select a particular communication company's communication services from among a plurality of communication companies to call a communication terminal usable with a plurality of communication companies, each communication company endeavors to entice as much use of its communication services as possible.

SUMMARY OF THE INVENTION

It is an object of the present invention to provide called parties with an additional service based on the length of the communication time and/or the amount of communication per unit time.

A called party which contracts for additional service with a communication company which provides the additional service according to the present invention causes a setting to be made such that a connection is first made to the communication company, and therefore, it is expected that communication through the communication company increases.

The following are examples of the additional service. The communication charge for communications made by the called party through the communication company may be discounted or qualify for a cashback deal, according to the length of the communication time or the amount of communication, or the length of the communication time and the amount of communication per unit time for calls received by the called party.

If calling parties also use the same communication company to make the calls received by the subscribing called party, communication charge for communications in which the called party makes calls through the communication company may also be discounted or qualify for a cashback deal, according to a communication time or the amount of communication, or a communication time and the amount of communication per unit time for calls received by the called party and sent by the calling parties.

A communication charge discount may be calculated according to all communications for calls made through the communication company to the called party which has contracted for additional service with the communication company, and also according to all communications for calls received by the called party and sent by calling parties both through the communication company. Communication-charge discount may also be calculated according to all communications for calls sent through the communication company and also according to all communications for calls sent not through the communication company.

In one aspect, there is provided a method of providing an additional service to the user of a communication company's communication service, the method comprising providing an additional service to the user who received a call through the communication service of the communication company, in accordance with a communication time.

A method of providing an additional service to a user of a communication company's communication service, the method comprising providing an additional service to the user who received a call through the communication service of the communication company, in accordance with the amount of communication.

In yet another aspect, there is provided an additional service providing apparatus used by a communication company that provides communication services, the apparatus comprising: informing means for informing a user, who uses the communications services of the communication company, of a call sent to the user; and providing means for providing at least one additional service for the user in accordance with the time of communication.

In still another aspect, there is provided an additional service providing apparatus used by a communication company that provides communication services, the apparatus comprising: sending means for sending a call sent to a user, who uses the communication service of the communication company; and providing means for providing at least one additional service to the user in accordance with amount of communication measured by said measuring means.

In another aspect, there is provided a computer program product loadable into the internal memory of a digital computer, comprising program code portions for performing the steps of: measuring a communication time of a call to a user through a communication service of a communication company; and providing an additional service to a user according to the communication time measured by said program code for measuring a communication time.

In still another aspect, there is provided a computer product loadable into the internal memory of a digital computer, comprising program code portions for performing the steps of: measuring an amount of communication of a call to a user through a communication service of a communication company; and providing at least one additional service to a user according to the communication amount measured by said program code for measuring a communication time.

In a further aspect of the present invention, there is provided a communication system including an accumulator for accumulating a communication time or the amount of communication of a call received by a subscriber, or for accumulating the communication time and the amount of communication, wherein additional service is provided according to the value of the accumulator.

In a further aspect, there is provided a communication system comprising: a third switching office for determining whether a first communication company and a second communication company are identical, wherein the first communication company provides a communication service between a called party and a first switching office, and the second communication company provides a communication service between a calling party and a second switching office, and at least one additional service is provided according to the determination made by said third switching office.

Further objects, features and advantages of the present invention will become apparent from the following description of the preferred embodiments with reference to the attached drawings.

BRIEF DESCRIPTION OF THE DRAWINGS

FIG. 5 is a view of the contents of a database 901.

FIG. 8 is a view of first example discount.

FIG. 11 is a view of second example discount.

FIG. 14 is a view of third example discount.

DESCRIPTION OF THE PREFERRED EMBODIMENTS

Figure 1:
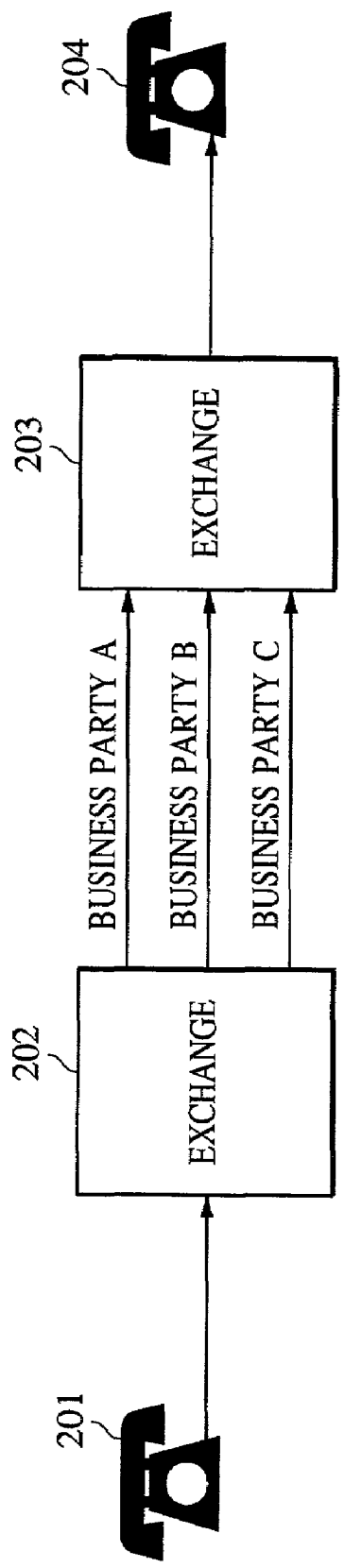
FIG. 1 is a schematic view of a conventional communication network.
Figure 2:
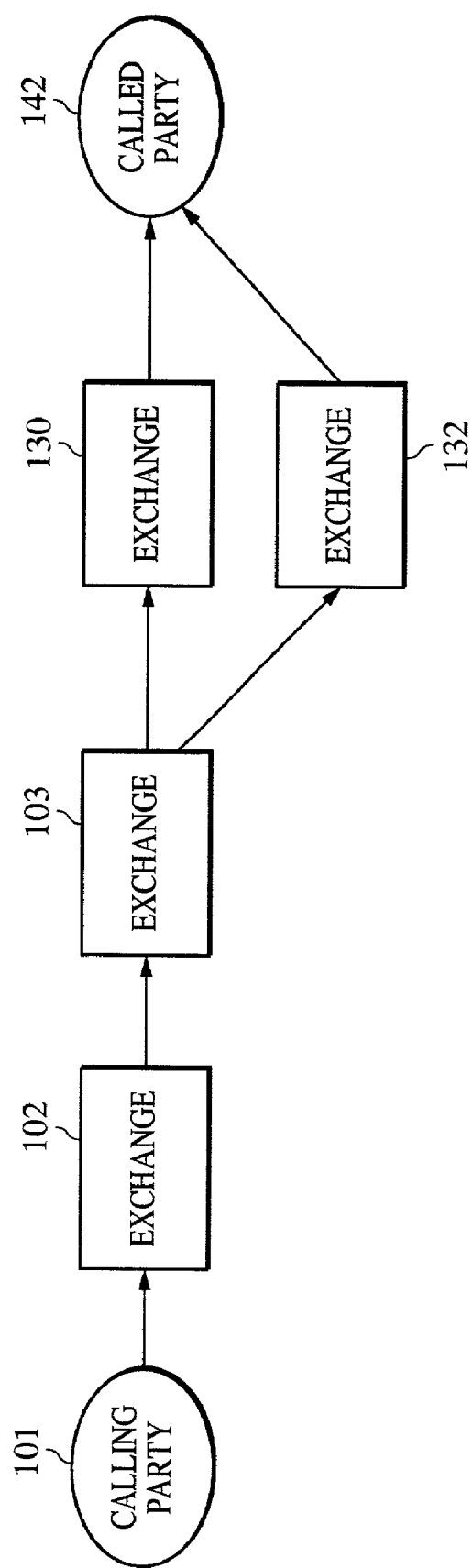
FIG. 2 is a schematic view of a communication system according to the present invention.

FIG. 2 is a schematic representation of a communication system according to the present invention. In FIG. 2, an exchange 102 is a closest exchange to a calling party 101, and an exchange 130 is a closest exchange to a called party 142. An exchange 103 connects the exchange 102 to the exchange 130. An exchange 132 is also a closest exchange to the called party 142, and connects the called party 142 to the exchange 103. The called party is connected to the exchanges 130 and 132 by, for example, radio lines.

The called party 142 has (1) a terminal which can use the transmitting and receiving services of both exchanges 130 and 132, or (2) a terminal which can use the transmitting and receiving service of the exchange 130 and a terminal which can use the transmitting and receiving service of the exchange 132. The calling party 101 makes a call to the called party 142 using a number for connection through the exchange 130 or a number for connection through the exchange 132. Alternatively, the calling party 101 uses a number unique to the called party 142 to make a call, and the exchange 103 selects one of the exchanges 130 and 132 according to a determination reference described later.

When the calling party 101 is connected to the called party 142 through the exchange 130, the exchange 130 measures the time (or amount) of communication between the calling party 101 and the called party 142, and bills the calling party 101 a communication charge through a communication company which operates the exchange 102. The communication charge is calculated according to the time of the communication or the amount of data communicated. When the connection is made through the exchange 132, the exchange 132 performs the same operations. In the present invention, a communication company X which operates the exchange 130 bills the called party 142 which is a subscriber to the communication company for communication charge every month, but the communication charge is discounted according to the time or amount of communication. In an embodiment of the present invention, when a terminal of the called party 142 can receive e-mail, the discount is reported to the terminal using e-mail to prompt the called party 142 to use the communication company.

An additional service according to a first embodiment of the present invention is a discount on the communication charge for which the communication company X bills a user A when the user A uses the communication company X, the discount being determined according to the time or the amount of communication, or according to the time and amount of communication through which the user A uses the communication service of the communication company X providing the additional service.

Figure 3:
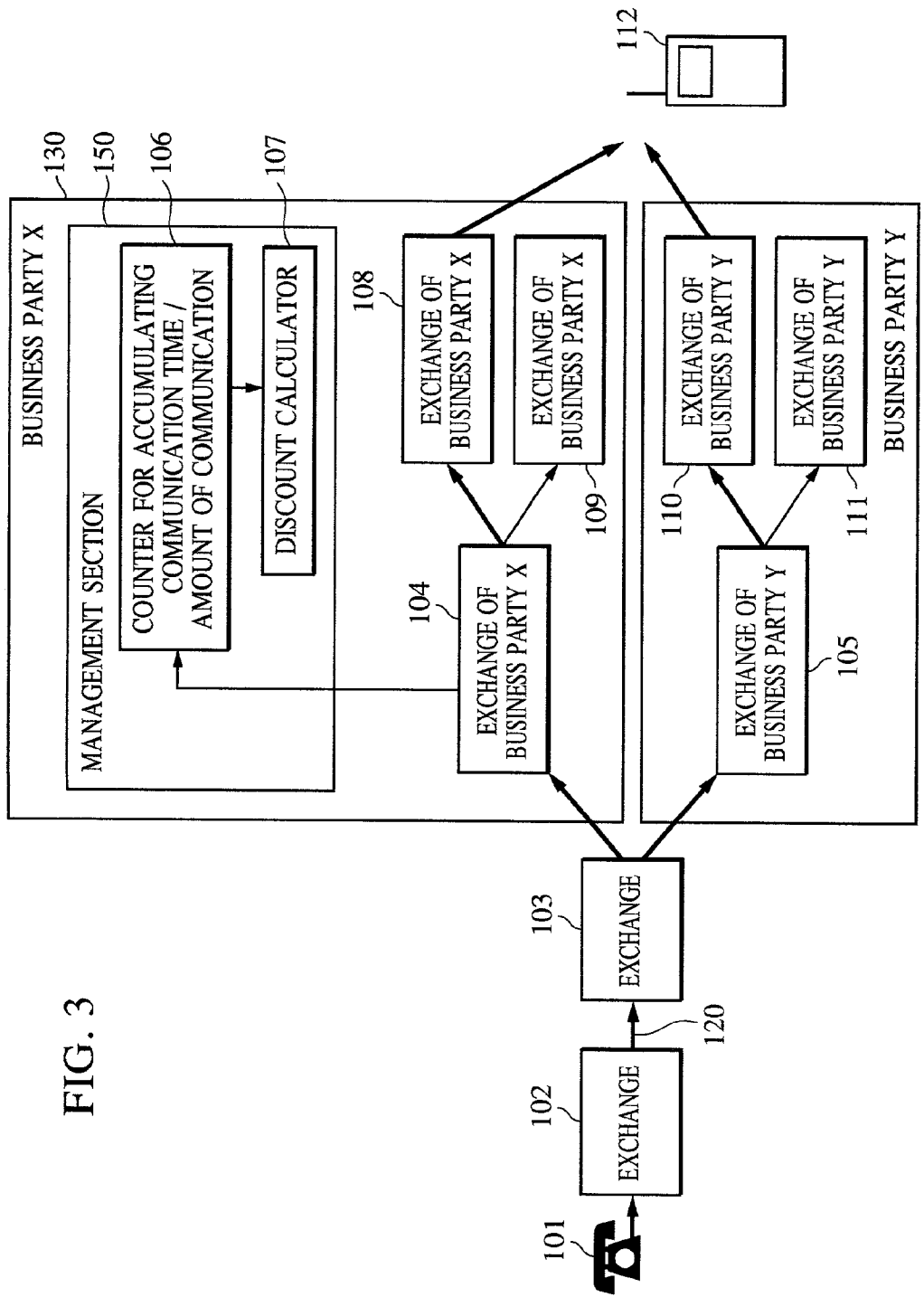
FIG. 3 is a schematic view of a communication network according to the present invention.

FIG. 3 is a schematic view showing a communication network according to the present invention. It is assumed here that the called party 142 has a terminal 112 which can use the transmitting and receiving services of both exchanges 130 and 132. The present invention can also be applied to a case in which the called party 142 has a terminal for the exchange 130 and a separate terminal for the exchange 132. FIG. 3 shows details of the exchange 130 of the communication company X and the exchange 132 of a communication company Y. In FIG. 3, the exchange 130 of the communication company X includes exchanges 104, 108, and 109, and the exchange 132 of the communication company Y includes exchanges 105, 110, and 111.

The line through which the calling party 101 has made a call is connected from the closest exchange 102 to the exchange 103 which determines a communication company which connects the exchange to the communication terminal 112 to be called. Communication service between the closest exchange 102 and the exchange 103 may be provided by a single communication company 120 or a plurality of communication companies 120.

When a plurality of communication companies 104 and 105 can be connected to the exchange 103 according to a telephone number being called exists, the exchange 103 determines a communication company which connects the exchange to the communication terminal 112 according to a system restriction, such as, for example, a condition in which a communication company cannot connect to the party being called because the party being called is out of the range where the communication company provides communication service; a condition selected by the calling party, such as, for example, a condition in which a communication company which bills a low communication charge is to be connected; and a condition selected by the party being called, such as, for example, a condition in which a predetermined communication company is connected by priority. The calling party 101 may select either a number used to call the communication terminal 112 through the communication company X (130) or a number used to call the communication terminal 112 through the communication company Y (132) to make a call.

It is assumed here that the communication company X (130) providing a discount as the additional service is selected. The exchange 104 of the communication company X determines which communication terminal is being called, selects an exchange to be connected from the exchanges 108 and 109, and monitors the time or amount of communication, or the time and amount of communication in the call to the communication terminal 112.

The line is connected to the exchange 108, and the exchange 108 connects the line to the communication terminal 112, which is being called. A management section 150 of the communication company X (130) includes an accumulating counter 106 for measuring the time and amount of communication within a predetermined time, which measurements are used as references to determine the amount of discount when a communication charge discount is applied as the additional service; and a discount calculator 107 for calculating discount from the values measured in the predetermined time. The management section 150 also includes a memory for managing a charge for which the party 142, a subscriber to the communication company X (130), using the terminal 112 is billed. When the terminal 112 is used to make a call, a charge for which the user 142 of the terminal 112 is billed is stored in the memory. The accumulating counter 106 is located in the memory, and accumulates the time of communication in which the terminal 112 is called, in order to determine discount on the charge for which the user 142 of the terminal 112 is billed.

Figure 4:
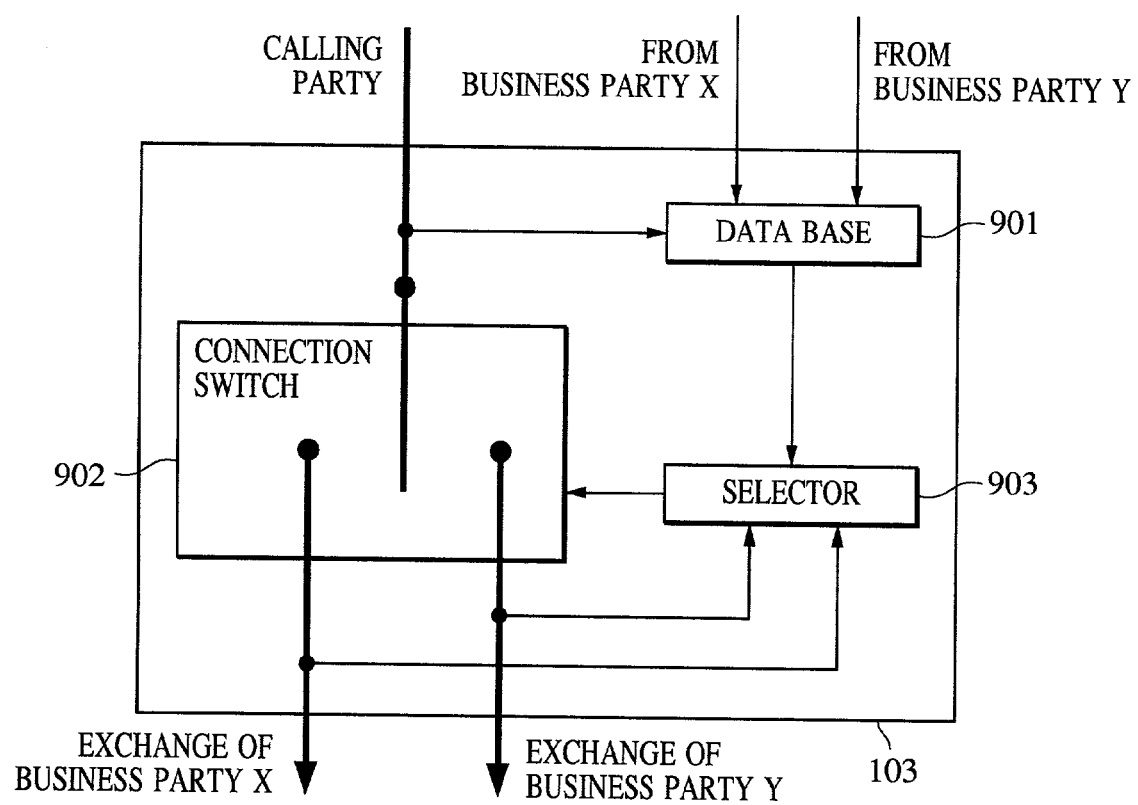
FIG. 4 is a schematic view of a switching office which selects a communication company to be connected.

The exchange 103, which determines a communication company which connects the exchange to the communication terminal 112, has a structure shown in FIG. 4.

More specifically, the exchange 103 includes a database 901 for storing a system condition, a condition required by the calling party, and a condition required by the called party, as well as necessary information used to determined a communication company to which the line is to be connected, according to the conditions; a selector 903 for selecting a communication company which connects the exchange 103 to the communication terminal 112 according to the conditions and information stored in the database 901; and a connection switch (SW) 902 for connecting the line to the selected communication company.

In the present embodiment, as calls received through a predetermined communication company increase, the called party 142 obtains increased communication charge discounts. Therefore, the database 901 has a condition in which a communication company specified in advance by the called party is connected by priority, and the called party itself can change the condition by making a call to a predetermined number. A communication company which manages the exchange 103 can change the database 901 according to a request made by the called party. More specifically, the database 901 has setting means for setting required conditions. A subscriber can make a call to a predetermined telephone number to access the setting means to set the database 901. In a form in which the exchange 103 can select either the communication company X or the communication company Y when a call is sent to the called party 142, the database 901 registers a condition that which of the communication companies X and Y is selected by the called party 142.

FIG. 5 shows example contents of the database 901.

As shown in FIG. 5, conditions for determining a communication company which connects the exchange 103 to the communication terminal 112 may include, for example, whether the communication company provides e-mail service, whether the communication company provides web service, whether the communication company provides a being-called notice during busy time, whether communication is possible in predetermined locations, such as an underground shopping center, and whether the communication company provides the least communication charge, the highest communication speed, or the largest service area among communication companies.

Figure 6:
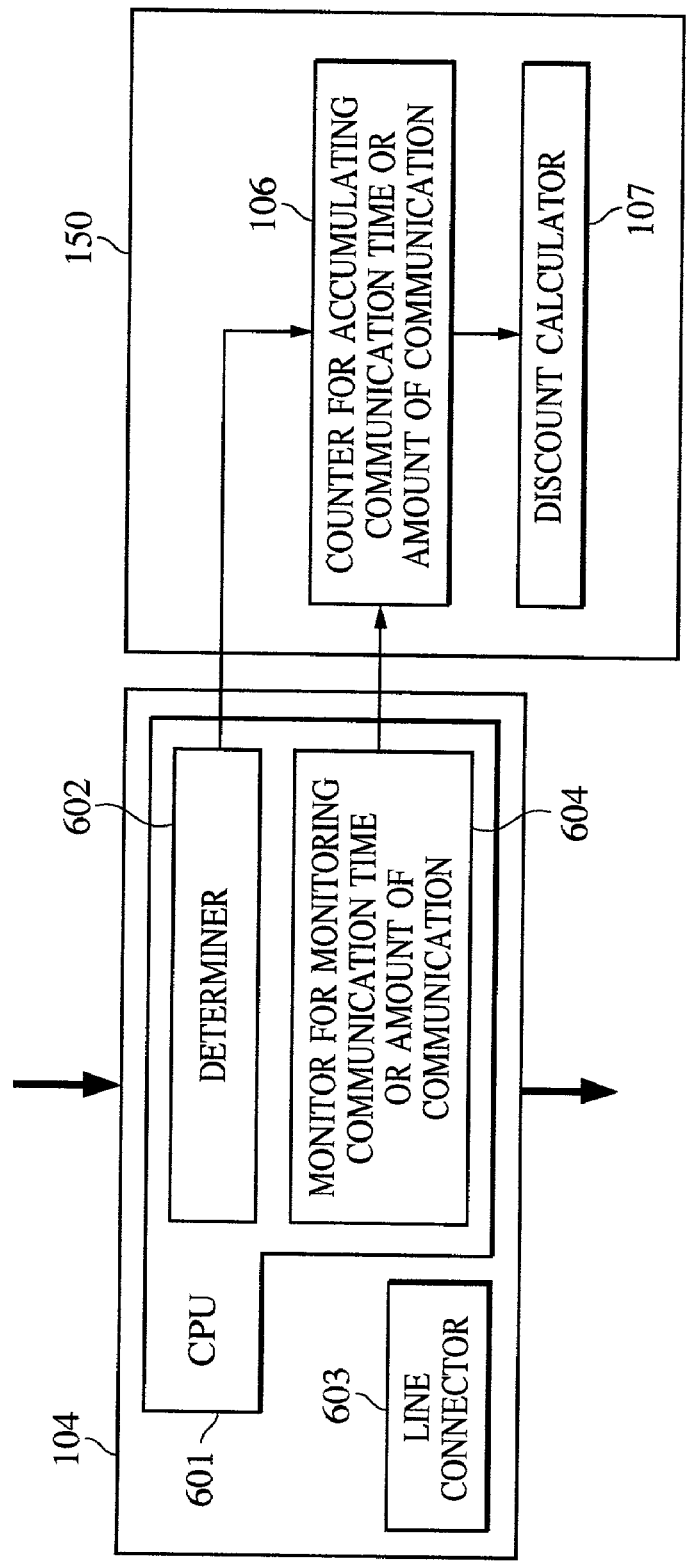
FIG. 6 is a schematic view of an exchange for implementing a first additional service in a first embodiment.

FIG. 6 shows schematically the structure of the exchange 104, to which the line is first connected in the communication company X.

More specifically, the exchange 104 includes a CPU 601 for controlling the exchange 104, and a line connector 603 for connecting the line. The CPU 601 includes a determiner 602 for determining a party to be called, and a monitor 604 for monitoring the time and amount of communication.

The accumulating counter 106 accumulates the time or amount of communication, or the time and amount of communication made to the subscriber according to the results of determination and monitoring performed by the determiner 602 and the monitor 604, respectively, and the discount calculator 107 calculates a discount for the subscriber 142 (not shown) at a predetermined time interval.

The accumulating counter 106 and the discount calculator 107 are needed for each subscriber 142 contracting additional service, and they may be located in the exchange 104 or somewhere in the system of the communication company providing the additional service. Since the memory for billing for a charge of sending a call from the subscriber 142 is provided for each subscriber 142, the counter 106 could be located in the memory.

Figure 7:
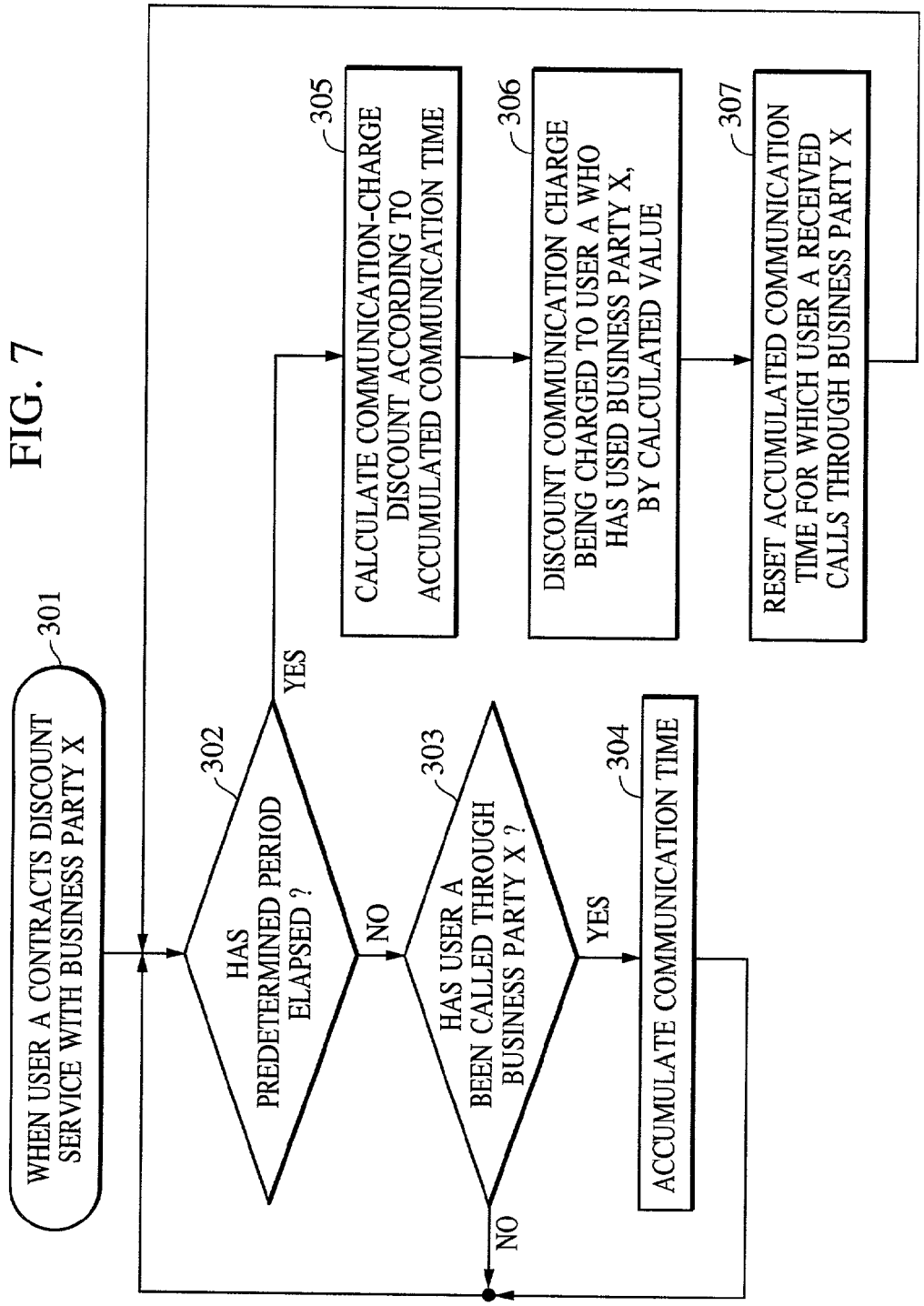
FIG. 7 is a flowchart of a case in which the first additional service is provided for a called party.

FIG. 7 is a flowchart of a case in which a first additional service is provided for a called party. FIG. 7 shows a part of a program executed by the management section 150, which is a computer.

In the service provided for a called party in the present embodiment, a user A (called party 142) of the communication terminal 112, who can contract with a plurality of communication companies X and Y, contracts with the communication company X in step 301 for a discount on the communication charge for which the called party 142 is billed for use of the communication service of the communication company X, the discount being calculated according to the length of communication time and the amount of commination in which calls are received through the communication company X within a predetermined period.

In the contract, it is assumed that the discount rate is calculated according to the time of communication. After the effective date of the contract, the communication charge is discounted at an interval of the predetermined period. When the user A (142) receives a call through the communication company X within the predetermined period in step 303, a communication time used by the call is accumulated in step 304. The accumulating counter 106 accumulates a communication time each time the user A (142) receives a call through the communication company X in step 304. When the user A receives a call through a communication company other than communication company X in step 303, no operation is performed until the predetermined period has elapsed or the user A has received the next call through the communication company X.

When the predetermined period has elapsed in step 302 for the contract between the user A (142) and the communication company X, the discount on the communication charge for which the user A is billed for the use of the communication company X is calculated in step 305 from an accumulated communication time calculated in step 304 by the accumulating counter 106. The communication charge for which the user A is billed for the use of the communication company X's communication services is discounted by the calculated value in step 306. Then, the accumulated communication time calculated in step 304 by the accumulating counter 106 is reset in step 307.

In other words, the communication company X (130) bills the calling party 101 for the communication charge according to a communication time based on calls sent from the calling party 101 and received by the called party 142, through a communication company which operates the exchange 102 whereas the communication company X discounts the amount of money charged to the calling party 101, according to the communication time per month for the called party 142, which is a subscriber to the communication company X (130).

The discount may be a constant amount of money or a constant percentage for the accumulated value.

FIG. 8 shows a first example of discount calculation.

In FIG. 8, discount on communication charge for the use of the communication company X by the user A (142) differs depending on the time of communication for calls received by the user A. For example, when the user A uses the communication company X to receive calls for two hours within the predetermined period, if the user uses the communication company X for communication, the communication charge applied to the user A within the predetermined period is discounted at 5%.

The additional service may be provided according to which communication company is used by a calling party to send a call.

Figure 9:
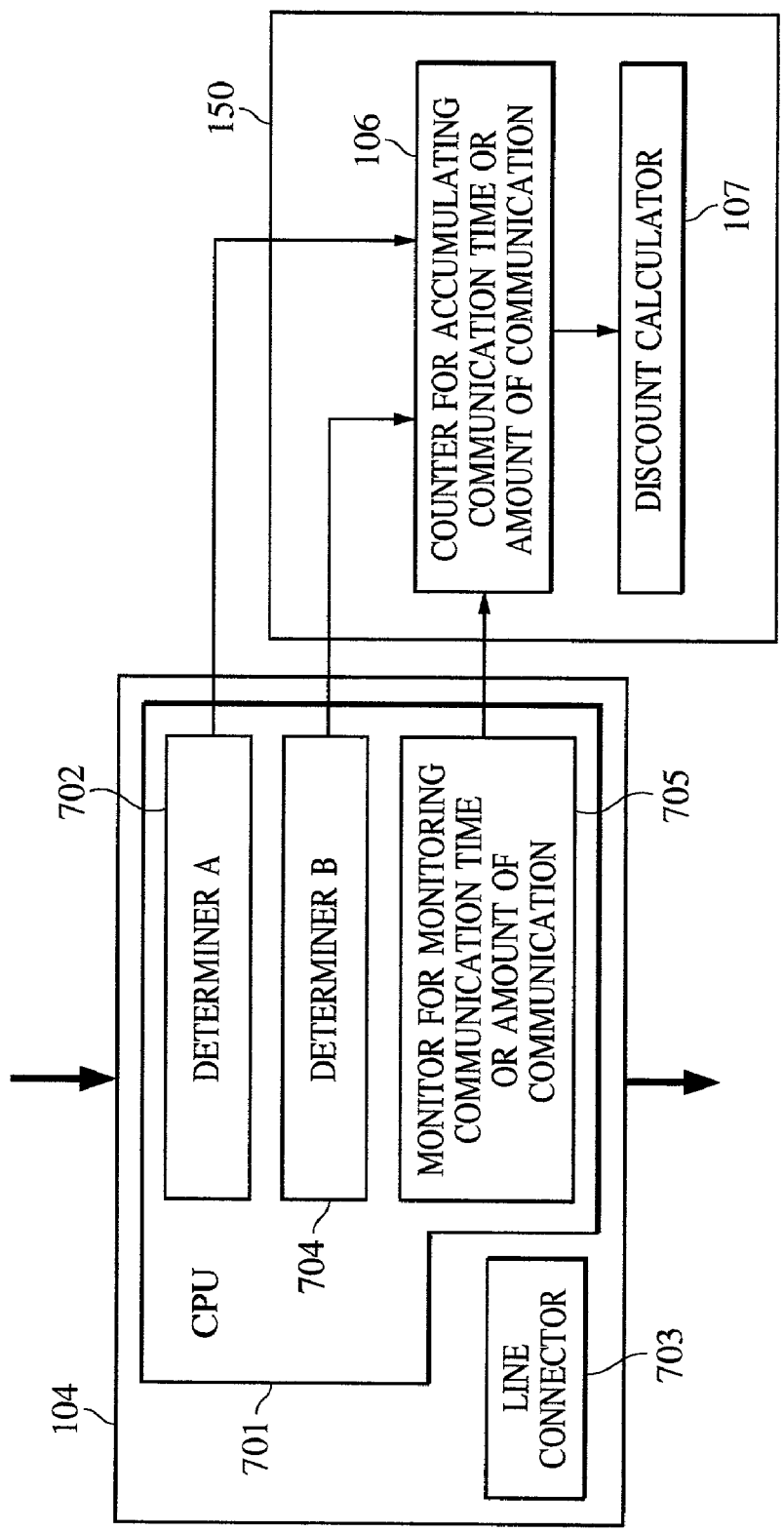
FIG. 9 is a schematic view of an exchange for implementing a second additional service in a second embodiment.

An exchange 104 according to a second embodiment, which corresponds to the above case has a structure shown in FIG. 9, and determines whether a communication company providing communication service between a communication terminal of a called party and a switching office and a communication company providing communication service between a communication terminal of a calling party and a switching office are identical.

More specifically, the exchange 104 according to the present embodiment includes a CPU 701 for controlling the exchange 104, and a line connector 703 for connecting the line. The CPU 701 includes a determiner A (702) for determining a party to be called, a determiner B (704) for determining whether the calling party 101 sends a call through the communication company X, and a monitor 705 for monitoring the time and amount of communication.

The accumulating counter 106 accumulates the time or amount of communication, or the time and amount of communication made to the subscriber 142 when a call is sent through the communication company X, according to the results of determination and monitoring performed by the determiner A (702), the determiner B (704), and the monitor 705. The discount calculator 107 then calculates the discount for the subscriber 142 at a predetermined time interval.

The accumulating counter 106 and the discount calculator 107 are needed for each subscriber 142 contracting additional service, and they may be located in the exchange 104 or somewhere in the system of the communication company X providing the additional service.

Figure 10:
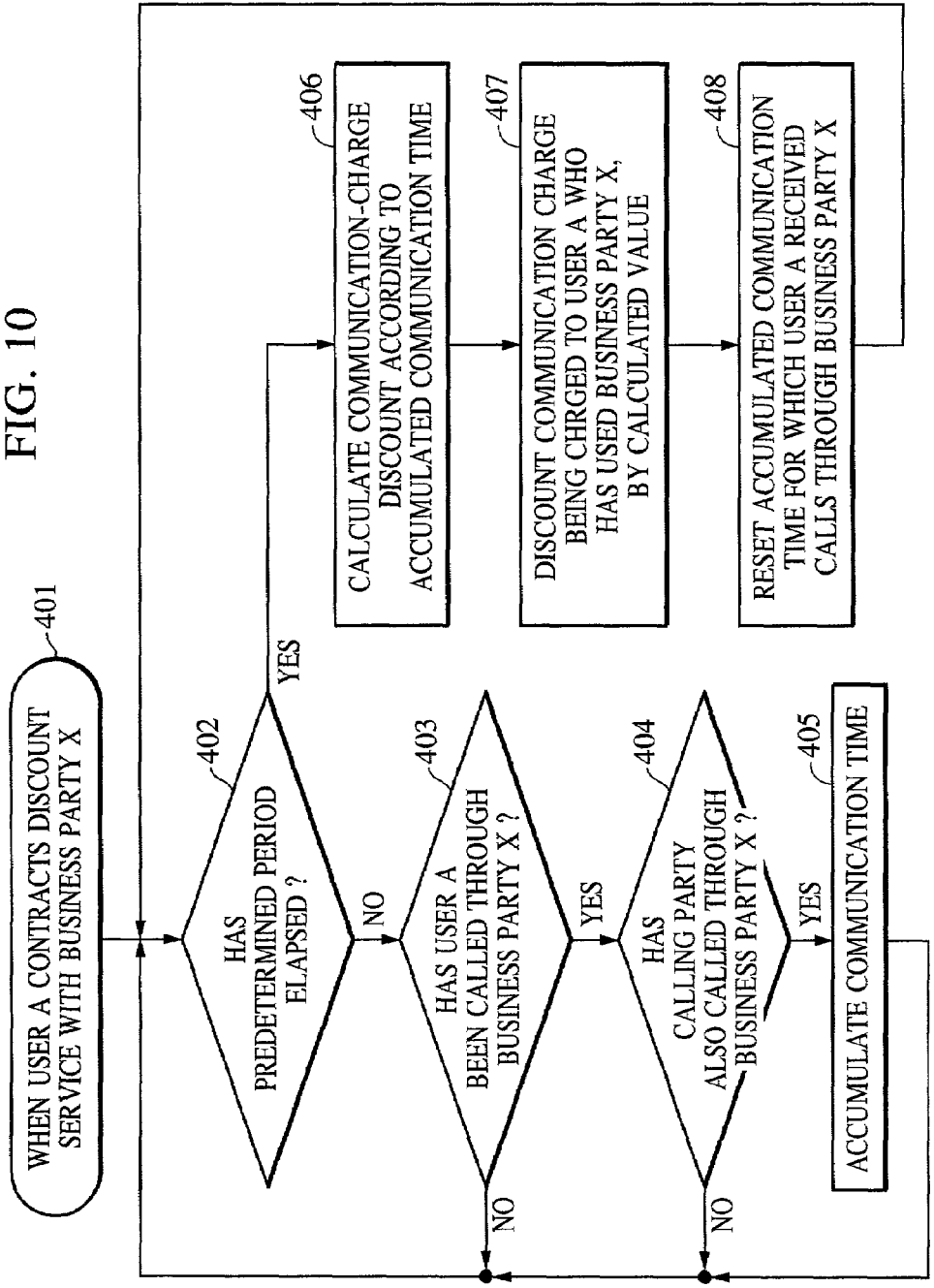
FIG. 10 is a flowchart of a case in which the second additional service is provided for a called party.

FIG. 10 is a flowchart of a case in which a second additional service is provided for a called party. FIG. 10 shows a part of a program executed by the management section which is a computer.

In the service provided for a called party in the present embodiment, the user A (called party 142) of the communication terminal 112, who can contract with a plurality of communication companies, contracts with the communication company X in step 401 for a discount on the communication charge for which the called party 142 is billed for the use of the communication service of the communication company X, the discount being calculated according to the time and amount of commination in which calls are sent through the communication company X and received through the communication company X within a predetermined period. In the contract, it is assumed that the discount rate is calculated according to the time of communication.

After the effective date of the contract, communication charge is discounted at an interval of the predetermined period. When the user A (142) receives a call through the communication company X within the predetermined period in step 403, if the calling party 101 also uses the communication company X to send that call in step 404, a communication time used by the call is accumulated in step 405. The accumulating counter 106 accumulates a communication time each time the user A (142) receives a call through the communication company X, which is sent by the calling party 101 through the communication company X, in step 405. In other words, when the communication company X operates the exchange 102 closest to the calling party 101, the communication time is accumulated.

When the user A receives a call through a communication company other than communication company X in step 403, or when the calling party sends the call through a communication party other than communication company X in step 404, no operation is performed until the predetermined period has elapsed or the user A has received the next call through the communication company X. When the predetermined period has elapsed in step 402 for the contract between the user A (142) and the communication company X, discount on communication charge for which the user A is billed for the use of the communication company X is calculated in step 406 from an accumulated communication time calculated in step 405 by the accumulating counter 106. The communication charge for which the user A is billed for the use of the communication company X's communication services is discounted by the calculated value in step 407. Then, the accumulated communication time calculated in step 405 by the accumulating counter 106 is reset in step 408.

The discount may be a constant amount of money or a constant percentage for the accumulated value.

FIG. 11 shows a second example of discount calculation.

In FIG. 11, discount on communication charge for the use of the communication company X by the user A (142) differs depending on the time of communication for calls sent through the communication company X and received by the user A (142). For example, when the user A (142) uses the communication company X to receive calls for two hours within the predetermined period, if the user A (142) uses the communication company X for communication, a communication charge applied to the user A within the predetermined period is discounted at 10%.

Discount service α in which the communication charge for calls sent not through the communication company X is discounted according to the time or amount of communication, or the time and amount of communication made in calls received by the use of the communication service of the communication company X, and discount service β in which the communication charge for calls sent through the communication company X is discounted according to the time or amount of communication, or the time and amount of communication made in calls received by the use of the communication service of the communication company X may be provided together.

Figure 12:
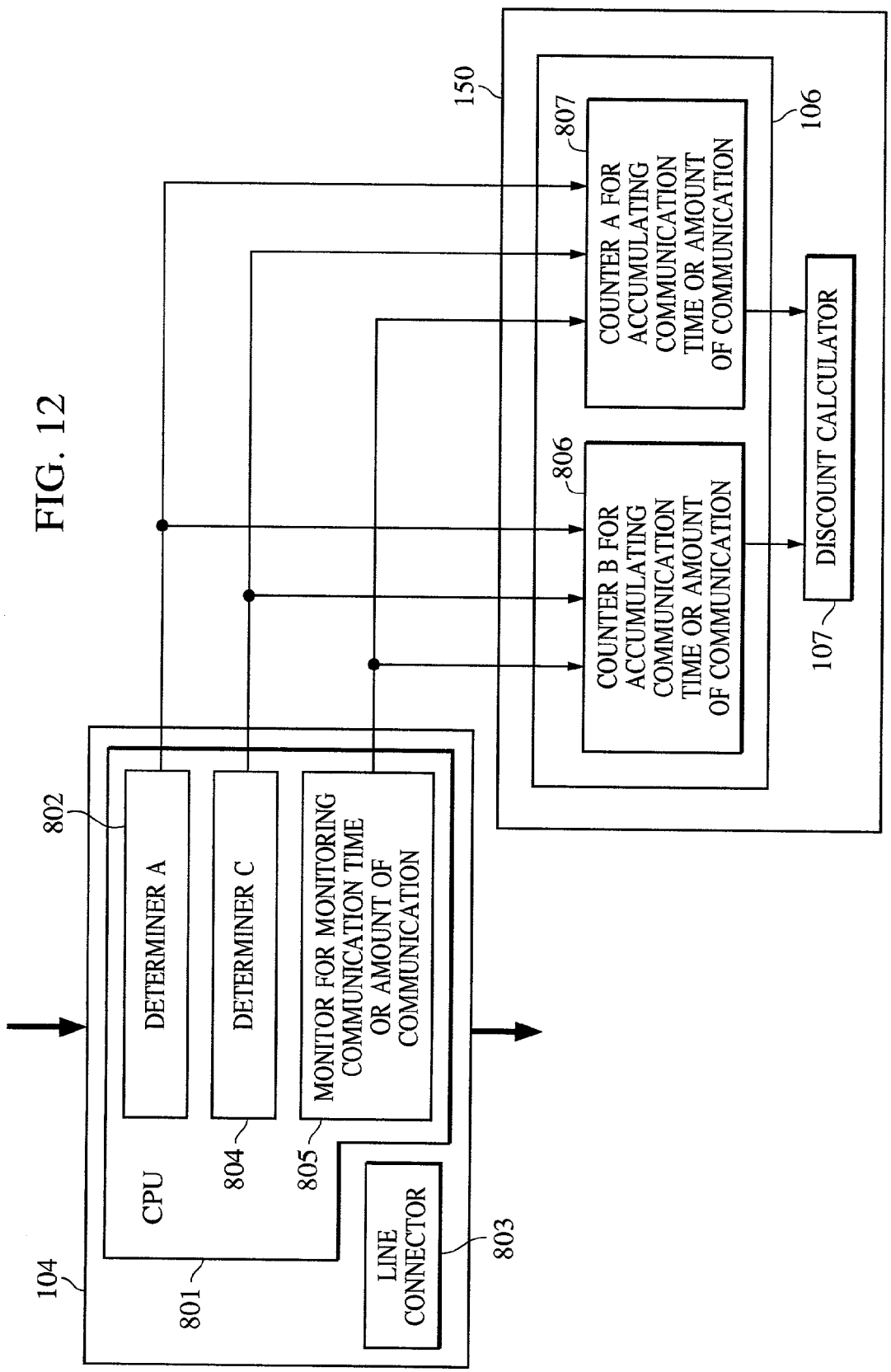
FIG. 12 is a schematic view of an exchange for implementing the first additional service and the second additional service in a third embodiment.

An exchange 104 according to a third embodiment, which corresponds to the above service, has a structure shown in FIG. 12. More specifically, the exchange 104 includes a CPU 801 for controlling the exchange 104, and a line connector 803 for connecting the line. The CPU 801 includes a determiner A (802) for determining a party to be called, a determiner C (804) for determining whether the calling party 101 sends a call through the communication company X, and a monitor 805 for monitoring the time and amount of communication.

The accumulating counter 106 includes an accumulating counter A (807) and an accumulating counter B (806). The accumulating counter A (807) accumulates the time or amount of communication, or the time and amount of communication made to the subscriber 142 when a call is sent through a communication company other than communication company X, according to the results of determination and monitoring performed by the determiner A (802), the determiner C (804), and the monitor 805. The accumulating counter B (806) accumulates the time or amount of communication, or the time and amount of communication made to the subscriber 142 when a call is sent through the communication company X, according to the results of determination and monitoring performed by the determiner A (802), the determiner C (804), and the monitor 805.

The discount calculator 107 calculates a discount for the subscriber 142 at an interval of a predetermined time, according to the results of the accumulating counter A (807) and the accumulating counter B (806). The accumulating counter A (807), the accumulating counter B (806), and the discount calculator 107 are needed for each subscriber contracting additional service, and they may be located in the exchange 104 or somewhere in the system of the communication company X providing the additional service.

Figure 13:
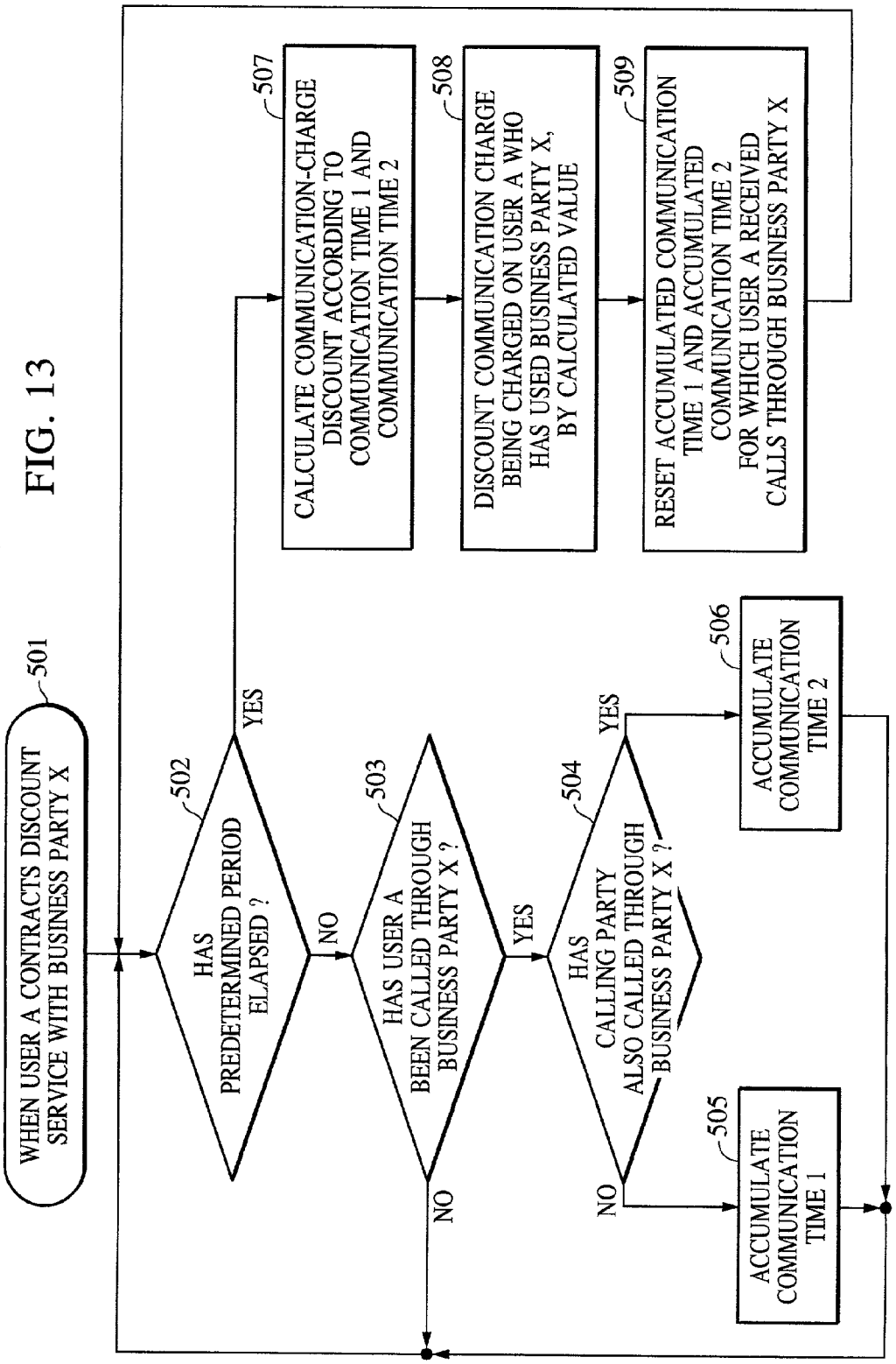
FIG. 13 is a flowchart of a case in which the first additional service and the second additional service are both provided for a called party.

FIG. 13 is a flowchart of a case in which the first additional service and the second additional service are provided together for a called party. FIG. 13 shows a part of a program executed by the management section 150, which is a computer.

In the service provided for the called party in the present embodiment, the user A (called party 142) of the communication terminal 112, who can contract with a plurality of communication companies, contracts with the communication company X in step 501 for a discount on the communication charge for which the called party 142 is billed for the use of the communication service of the communication company X, the discount being calculated according to the time and amount of commination in which calls are sent not through the communication company X and received through the communication company X within the predetermined period and according to the time and amount of commination in which calls are sent through the communication company X and received through the communication company X within the predetermined period.

In the contract, it is assumed that the discount rate is calculated according to the time of communication. After the effective date of the contract, the communication charge is discounted at an interval of the predetermined period. When the user A (142) receives a call through the communication company X within the predetermined period in step 503, if the calling party 101 uses a communication company other than the communication company X to send that call in step 504, a communication time 1 used by the call is accumulated in step 505. In other words, each time a call is sent through a communication company other than communication company X and received by the user A (142) through the communication company X, accumulation is performed in step 505. If the calling party 101 also uses the communication company X to send that call in step 504, a communication time 2 used by the call is accumulated in step 506.

Each time a call is sent through the communication company X and received by the user A (142) also through the communication company X, accumulation is performed in step 506. In other words, when the communication company X does not operate the exchange 102 closest to the calling party 101, the communication time 1 is accumulated; and when the communication company X operates the exchange 102 closest to the calling party 101, the communication time 2 is accumulated.

When the user A receives a call through a communication company other than communication company X in step 503, no operation is performed until the predetermined period has elapsed or the user A has received the next call through the communication company X. When the predetermined period has elapsed in step 502 for the contract between the user A (142) and the communication company X, discount on communication charge for which the user A is billed for the use of the communication company X is calculated in step 507 from an accumulated communication time 1 calculated in step 505 and an accumulated communication time 2 calculated in step 506. The communication charge for which the user A is billed for the use of the communication company X's communication services is discounted by the calculated value in step 508. Then, the accumulated communication time 1 and the accumulated communication time 2 are reset in step 509.

The discount may be a constant amount of money or a constant percentage for the accumulated value.

The discount is calculated as shown in FIG. 11 and FIG. 14.

FIG. 11 shows discount on communication charge for the use of communication company X's communication services by the user A (142), obtained when calls were made through the communication company X. FIG. 14 shows a discount on the communication charge for the use of communication company X's communication services by the user A (142), obtained when calls are made through a communication company other than communication company X. For example, when the user A (142) uses the communication company X to receive calls sent through the communication company X for two hours within the predetermined period, and uses the communication company X to receive calls sent not through the communication company X for five hours within the predetermined period, if the user A (142) uses the communication company X for communication, communication charge applied to the user A within the predetermined period is discounted at 20% (10%+ 10%).

In another embodiment, a communication time 1 is accumulated irrespective of which communication company is used by the calling party. The communication charge applied to the user A (142) is discounted according to the communication time 2 for which the calling party used the communication company X and according to the communication time 1. In other words, the communication company X providing communication service between a communication terminal of the called party and a switching office provides the called party with additional service determined according to the time of communication within a unit time or the amount of communication within the unit time, or the time and amount of communication within the unit time, made in calls sent through the communication company X, and according to the time of communication within the unit time or the amount of communication within the unit time, or the time and amount of communication within the unit time, made in calls sent through any communication companies.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of providing an additional service to a called party having a subscription to a communication company's communication service, the method comprising:
    billing a calling party for a call from the calling party to the called party, wherein the call is received by the called party through an exchange of the communication company; and
    providing the additional service to the called party based on a communication time of the received call, and in accordance with the subscription,
    wherein the additional service is a discount of a communication charge of outgoing calls made by the called party using the communication company's communication service, the discount calculated in accordance with the communication time.

2. The method according to claim 1, wherein the communication company provides the additional service in accordance with the communication time and the amount of communication.

3. The method according to claim 1, further composing:
    accumulating communication times of calls received by the called party through an exchange of the communication company, wherein the communication company provides the additional service in accordance with an accumulated communication time of received calls, and in accordance with the subscription.

4. The method according to claim 3, wherein the communication company provides the additional service in accordance with (i) an accumulated communication time of calls received by the called party from calling parties using the communication services of the communication company and (ii) an accumulated communication time of calls received by the called party from calling parties whether or not the calling parties used the communication services of the communication company.

5. The method according to claim 1, wherein the additional service is further based on whether or not the calling party uses the communication services of the communication company to make the call to the called party.

6. The method according to claim 1, further comprising the step of measuring the communication time.

7. The method according to claim 1, wherein the called party receives the call via a radio line of one of a plurality of communication companies.

8. The method according to claim 1, wherein another communication company provides a communication service to the calling party, and the called party and the calling party are connected through a first exchange of the communication company and a second exchange of said another communication company.

9. A method of providing an additional service to a called party having a subscription to a communication company's communication service, the method comprising:
    billing a calling party for a call from the calling party to the called party, wherein the call is received by the called party through an exchange of the communication company; and
    providing the additional service to the called party based on an amount of communication of the received call, and in accordance with the subscription,
    wherein the additional service is a discount of a communication charge of outgoing calls made by the called party using the communication company's communication service, the discount calculated in accordance with the amount of communication.

10. The method according to claim 9, further comprising the step of measuring the amount of communication.

11. The method according to claim 9, wherein the called party receives the call via a radio line of one of a plurality of communication companies.

12. The method according to claim 9, wherein another communication company provides a communication service to the calling party, and the called party and the calling party are connected through a first exchange of the communication company and a second exchange of said another communication company.

13. An additional-service providing apparatus used by a communication company that provides communication services, comprising:
    informing means for informing a called party, who subscribes to the communication services of the communication company, of a call sent to the called party;
    an accumulation means for accumulating a time of communication of each call from a calling party the called party receives through the communication services of the communication company, the calling party of each call, not the called party informed of the call, being charged for the call; and
    providing means for providing an additional service to the called party in accordance with the accumulated time of communication,
    wherein the additional service is a discount of a communication charge of outgoing calls made by the called party using the communication company's communication services.

14. The additional service providing apparatus of claim 13, further comprising time measuring means for measuring a communication time of the call.

15. The apparatus according to claim 13, wherein said informing means informs the called party of the call via a radio line of one of a plurality of communication companies.

16. The apparatus according to claim 13, wherein another communication company provides a communication service to the calling party, and the called party and the calling party are connected through a first exchange of the communication company and a second exchange of said another communication company.

17. An additional-service providing apparatus used by a communication company that provides communication services, comprising:
   sending means for sending a call to a called party who subscribes to the communication services of the communication company;
   an accumulation means for accumulating an amount of communication of each call from a calling party sent to the called party through the communication services of the communication company, the calling party of each call, not the called party the call is sent to, being charged for the call; and
   providing means for providing an additional service to the called party in accordance with the accumulated amount of communication,
   wherein the additional service is a discount of a communication charge of outgoing calls made by the called party using the communication company's communication services.

18. The additional service providing apparatus of claim 17, further comprising time measuring means for measuring an amount of communication during the call.

19. The apparatus according to claim 17, wherein said informing means informs the called party of the call via a radio line of one of a plurality of communication companies.

20. The apparatus according to claim 17, wherein another communication company provides a communication service to the calling party, and the called party and the calling party are connected through a first exchange of the communication company and a second exchange of said another communication company.

21. Computer-executable program instructions loadable into the internal memory of a digital computer, comprising program code portions for performing the steps of:
   measuring a communication time of a call from a calling party to a called party through a communication service of a communication company to which the called party subscribes, wherein the calling party of the call, not the called party who receives the call, is charged for the call;
   accumulating the measured communication time of each call from a calling party to the called party; and
   providing an additional service to the called party according to the accumulated measured communication time,
   wherein the additional service is a discount of a communication charge of outgoing calls made by the called party using the communication company's communication service.

22. Computer-executable program instructions loadable into the internal memory of a digital computer, comprising program code portions for performing the steps of:
   measuring the communication amount of a call from a calling party to a called party through a communication service of a communication company to which the called party subscribes, wherein the calling party of the call, not the called party who receives the call, is charged for the call; and
   accumulating the measured communication amount of each call from a calling party to the called party; and
   providing an additional service to the called party according to the accumulated measured communication amount,
   wherein the additional service is a discount of a communication charge of outgoing calls made by the called party using the communication company's communication service.

23. A communication system comprising:
   an accumulator for accumulating at least one of a communication time and an amount of communication of each call from a calling party received by a called party through a communication service of the communication system to which the called party subscribes, wherein the calling party of each call, not the called party, is charged for the call; and,
   a discount calculator for calculating, based on the value of the accumulator, a discount on a communication charge to be paid by the called party to a communication company.

24. The communication system of claim 23, further comprising a charge calculator for calculating a communication charge in accordance with a value held by said accumulator.

25. The system according to claim 23, wherein the called party receives the call via a radio line of one of a plurality of communication companies.

26. The system according to claim 23, wherein a first communication company provides a communication service to the calling party, a second communication company provides a communication service to the called party, and the called party and the calling party are connected through a first exchange of the first communication company and a second exchange of the second communication company.

27. A communication system in which a called party is connected to a first exchange and a calling party is connected to a second exchange, the system comprising:
   a third exchange for determining whether said first exchange and said second exchange are operated by the same communication company to which the called party and the calling party subscribe, and
   wherein a discount on a communication charge is provided to the called party according to the determination made by said third exchange, and wherein the calling party, not the called party, is charged for a call to the called party, and wherein the discount is provided according to the communication time or the communication amount of the call provided to the called party through said first exchange.

28. A communication system according to claim 27, further comprising a fourth exchange for selecting one of a plurality of communication companies for connecting the called party according to (i) a system requirement in each of the plurality of communication companies, (ii) a condition required by the calling party, and (iii) a condition required by the called party when the plurality of communication companies provide communication services for the called party.

29. A communication system according to claim 28, wherein the fourth exchange comprises setting means for setting the required conditions,
   wherein the called party makes a call to a predetermined phone number to access said setting means.

30. The system according to claim 27, wherein the called party receives the call via a radio line of one of a plurality of communication companies.

* * * * *

UNITED STATES PATENT AND TRADEMARK OFFICE
CERTIFICATE OF CORRECTION

PATENT NO. : 7,224,782 B2  Page 1 of 1
APPLICATION NO. : 10/054908
DATED : May 29, 2007
INVENTOR(S) : Sano It is certified that error appears in the above-identified patent and that said Letters Patent is hereby corrected as shown below:

SHEET 10:
Fig. 10, "CHRGED" should read -- CHARGED --.

COLUMN 6:
Line 64, "commination" should read -- communication --.

COLUMN 8:
Line 27, "commination" should read -- communication --.

COLUMN 10:
Line 3, "commination" should read -- communication --;
Line 7, Q: "commination" should read -- communication --.

COLUMN 11:
Line 55 claim 3, "composing" should read -- comprising --.

Signed and Sealed this

Eighteenth Day of March, 2008

JON W. DUDAS
*Director of the United States Patent and Trademark Office*